United States Patent
Sparks et al.

(10) Patent No.: US 7,581,429 B2
(45) Date of Patent: Sep. 1, 2009

(54) MICROFLUIDIC DEVICE AND METHOD OF OPERATION

(75) Inventors: Douglas Ray Sparks, Whitmore Lake, MI (US); Rick Smith, Saline, MI (US); Nader Najafi, Ann Arbor, MI (US)

(73) Assignee: Integrated Sensing Systems, Inc., Ypsilanti, MI (US)

( * ) Notice: Subject to any disclaimer, the term of this patent is extended or adjusted under 35 U.S.C. 154(b) by 246 days.

(21) Appl. No.: 11/620,908

(22) Filed: Jan. 8, 2007

(65) Prior Publication Data

US 2007/0157739 A1    Jul. 12, 2007

Related U.S. Application Data

(60) Provisional application No. 60/756,488, filed on Jan. 6, 2006, provisional application No. 60/786,882, filed on Mar. 30, 2006.

(51) Int. Cl.
 *G01N 19/10* (2006.01)
(52) U.S. Cl. ....................................................... 73/32 A
(58) Field of Classification Search ................. 73/32 A, 73/32 R; 702/137
 See application file for complete search history.

(56) References Cited

U.S. PATENT DOCUMENTS

| | | | | |
|---|---|---|---|---|
| 4,085,349 A | * | 4/1978 | Farstad | 73/514.34 |
| 4,278,183 A | * | 7/1981 | Billington | 221/211 |
| 4,422,338 A | * | 12/1983 | Smith | 73/861.356 |
| 4,730,501 A | * | 3/1988 | Levien | 73/861.357 |
| 4,768,385 A | * | 9/1988 | Cage | 73/861.355 |
| 4,817,448 A | * | 4/1989 | Hargarten et al. | 73/861.356 |
| 5,398,554 A | * | 3/1995 | Ogawa et al. | 73/861.357 |
| 6,694,279 B2 | * | 2/2004 | Cunningham et al. | 73/861.356 |
| 6,932,114 B2 | * | 8/2005 | Sparks | 137/814 |

* cited by examiner

*Primary Examiner*—Hezron Williams
*Assistant Examiner*—Alex Devito
(74) *Attorney, Agent, or Firm*—Hartman & Hartman, P.C.; Gary M. Hartman; Domenica N. S. Hartman

(57) ABSTRACT

A microfluidic device and method for assessing properties of a fluid. The device includes a base supported by a substrate and a tube extending from the base and spaced apart from the substrate surface. The tube has an internal passage, first and second portions adjacent the base and defining, respectively, an inlet and outlet of the passage, and a distal portion. A drive electrode is located on the substrate surface adjacent the distal portion of the tube. Sensing electrodes are located on the substrate surface adjacent the first and second portions of the tube, and are adapted for sensing deflections of the first and second portions when vibrated with the drive electrode and from which the fluid property is determined. A pair of electrodes is located on the substrate surface between the drive and sensing electrodes, and are operated to enhance the performance of the microfluidic device, such as by supplementing the drive or sensing electrodes.

22 Claims, 3 Drawing Sheets

MICROFLUIDIC DEVICE AND METHOD OF OPERATION

CROSS REFERENCE TO RELATED APPLICATIONS

This application claims the benefit of U.S. Provisional Application No. 60/756,488 filed Jan. 6, 2006, and U.S. Provisional Application No. 60/786,882 filed Mar. 30, 2006, the contents of which are incorporated herein by reference.

BACKGROUND OF THE INVENTION

The present invention generally relates to devices and methods for measuring properties of fluids. More particularly, this invention relates to a microfluidic device equipped with a microchannel through which a fluid flows and means for ascertaining properties of the fluid while flowing through the microchannel.

Fluid delivery devices, systems, and methods involve technologies under constant development. Examples of fluid delivery systems of particular current interest include drug infusion systems and fuel cell systems, both of which require devices capable of delivering relatively small amounts of a fluid. While fuel cells have been used for many years to provide electrical power, currently there is increased interest for their use in consumer products such as automobiles, computers, cellular phones, personal digital assistants (PDA's), camcorders, and other portable devices. Fuel cell systems typically employ a small electrically powered fluid pump to deliver fluids to various parts of the system, such as water, fuels, and fuel cell solutions, examples of which include mixtures of water and fuels such as methanol, ethanol, ethylene glycol, isopropyl alcohol (IPA), formic acid, sulfuric acid, gasoline, diesel fuel, and other organic liquids. The solution is delivered to a fuel cell, such as a reformed fuel cell, direct methanol fuel cell (DMFC), or proton exchange membrane (PEM) fuel cell (or PEMFC), which can be adapted to provide power to a vehicle or other device that requires electrical power.

As well known in the art, in a fuel cell system it is important to know the concentration of a fuel in fuel cell solution to optimize the efficiency of the system. For example, DMFC's often employ a fuel cell solution of methanol mixed with water to reduce membrane crossover problems and boost the efficiency of the fuel cell. If the methanol concentration is too high, crossover problems can occur, whereas low methanol concentrations reduce the power output of the fuel cell. Consequently, various concentration sensors for fuel cell systems have been proposed, including electrolytic, refractometer, ultrasonic, electrochemical, electromagnetic, and electromechanical sensors. An example is an electromechanical system disclosed in commonly-assigned U.S. patent application Publication No. 2006/0213552 to Sparks et al., which makes use of a Coriolis-based fluid sensing device preferably of a type disclosed in commonly-assigned U.S. Pat. No. 6,477,901 to Tadigadapa et al., whose contents relating to the fabrication and operation of a Coriolis-based sensor are incorporated herein by reference. Sparks et al. teach that chemical concentrations, including those of fuel cell solutions, can be measured by sensing changes in fluid density as a fluid sample flows through a microchannel within a resonating tube of a Coriolis-based fluid sensing device.

A fluid sensing device 10 of a type disclosed by Tadigadapa et al. and Sparks et al. is represented in FIGS. 1 and 2. The device 10 is represented as including a micromachined tube 14 extending from a base 28 on a substrate 12 and having a freestanding portion 16 above a surface 18 of the substrate 12. Drive and sensing electrodes 22 and 24 are located on the surface 18 beneath the freestanding portion 16 of the tube 14, and bond pads 32 (only one of which is shown) are provided for transmitting input and output signals to and from the device 10. The drive electrode 22 can be, for example, capacitively coupled to the tube 14 for capacitively (electrostatically) driving the freestanding portion 16 at or near resonance, while the sensing electrodes 24 sense (e.g., capacitively, optically, etc.) the deflection of the tube 14 relative to the substrate 12 and provide feedback to enable the vibration frequency induced by the drive electrode 22 to be controlled with appropriate circuitry. With a fluid entering the device 10 through an inlet port 26 and flowing through an internal passage 20 within the tube 14, the freestanding portion 16 can be vibrated at or near resonance by the drive electrode 22 to ascertain certain properties of the fluid, such as flow rate and density, using Coriolis force principles. In particular, as the freestanding portion 16 is driven at or near resonance by the drive electrode 22, the sensing electrodes 24 sense a twisting motion of the freestanding portion 16, referred to as the Coriolis effect. Because the twisting motion is more readily detectible along the parallel legs of the freestanding portion 16, the sensing electrodes 24 may be positioned along the entire lengths of the legs. The degree to which the freestanding portion 16 deflects during a vibration cycle as a result of the Coriolis effect can be correlated to the mass flow rate of the fluid flowing through the tube 14, while the density of the fluid is proportional to the frequency of vibration at resonance. Notable advantages of the device 10 include the extremely miniaturized scale to which it can be fabricated and its ability to precisely analyze very small quantities of fluids. In FIG. 2, the device 10 is schematically shown as enclosed by a cap 30 to allow for vacuum packaging that further improves the performance of the device 10 by reducing air damping effects.

During fuel cell power generation processes, carbon dioxide and other gases are generated that can form bubbles within the fuel cell solution. Any air dissolved in the solution can also form bubbles under high temperature or low pressure conditions. Bubbles present in a liquid can cause errors in chemical concentration outputs based on density, as well as density measurements made by measuring speed of sound (ultrasonic measurements), refractive index, and other methods. Sensing errors can also occur over time as a result of films and residues building up on sensing elements such as tubes and windows, resulting in an offset shift in the chemical concentration output. For resonating tubes of the type employed by Sparks et al., bubbles present in the liquid being evaluated will increase the resonant frequency of the resonating tube, and build up of a film or residue on the internal surfaces of the tube will lower the resonant frequency of the tube, resulting in errors in density measurements.

The ability to detect potential measurement errors of the types noted above is complicated by other potential sources of sensor output drift, including imperfections due to manufacturing variations and defects, particles (or other second phases) in the fluid being sensed, differences in materials that lead to different responses to temperature and mechanical stress, charge buildup, and others. Therefore, while sensors of the type taught by Tadigadapa et al. and used by Sparks et al. have proven to be extremely precise in their ability to measure properties of fluids, further improvements capable of addressing the above-noted issues would be desirable.

BRIEF SUMMARY OF THE INVENTION

The present invention provides a microfluidic device and method for assessing properties of a fluid. The invention provides the capability of improving the performance of a microfluidic device, such as by improving the sensitivity of the device, and/or detecting potential measurement errors attributable to, for example, second phases such as gas bubbles in the fluid being evaluated, film buildup on the surfaces of the device contacting the fluid, and manufacturing and material variations and defects of the device itself.

According to a first aspect of the invention, a microfluidic device is provided that is operable to determine at least one property of a fluid. The device includes a structure comprising a base supported by a substrate and a tube extending from the base and spaced apart from a surface of the substrate so as to be capable of vibrating in a plane normal to the surface of the substrate. The tube has a continuous internal passage, a first portion adjacent the base and defining a fluid inlet of the passage, a second portion adjacent the base and defining a fluid outlet of the passage, and a distal portion relative to the base. A drive electrode is located on the surface of the substrate adjacent the distal portion of the tube, and is adapted for vibrating the tube. Sensing electrodes are located on the surface of the substrate adjacent the first and second portions of the tube. The sensing electrodes are adapted for sensing deflections of the first and second portions of the tube when vibrated with the drive electrode, and for producing outputs corresponding to the sensed deflections and from which the property of the fluid is determined. A pair of electrodes is located adjacent the tube and on the surface of the substrate between the drive electrode and the sensing electrodes. According to this aspect of the invention, the location of the sensing electrodes is preferably chosen to enhance the sensitivity and overall performance of the microfluidic device, and the pair of electrodes can be operated to supplement the drive or sensing electrodes, compensate for manufacturing and material variations and defects within the device, or otherwise promote the performance of the device.

According to a second aspect of the invention, a method is provided by which a microfluidic device is operated to sense the density of a fluid. A structure of the microfluidic device is vibrated as the fluid flows through a microchannel within the structure, a series of outputs is produced corresponding to the vibration frequency of the vibrating structure, and the density of the fluid flowing through the microchannel of the vibrating structure is determined on the basis of at least a first set of the outputs. In determining the fluid density, any outputs altered by a second phase in the fluid are excluded from the determination, and/or the density for any film build-up within the microchannel is offset from the fluid density. According to this aspect of the invention, the accuracy of the measurements performed by the microfluidic device is promoted by detecting sources of potential measurement errors attributable to, for example, second phases such as gas bubbles in the fluid being evaluated, film buildup on the surfaces of the device contacting the fluid, and manufacturing and material variations and defects of the device itself.

Other objects and advantages of this invention will be better appreciated from the following detailed description.

DETAILED DESCRIPTION OF THE INVENTION

Figure 1:
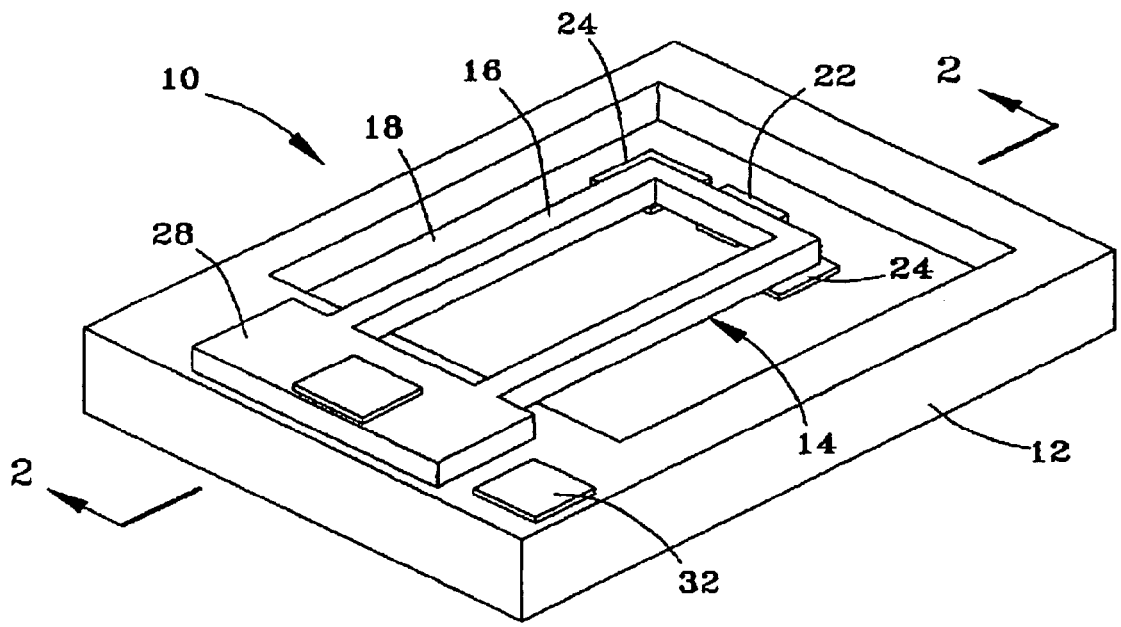
FIGS. 1 and 2 are perspective and cross-sectional views, respectively, of a microfluidic device with a resonating micromachined tube through which a fluid flows in accordance with the prior art.
Figure 2:
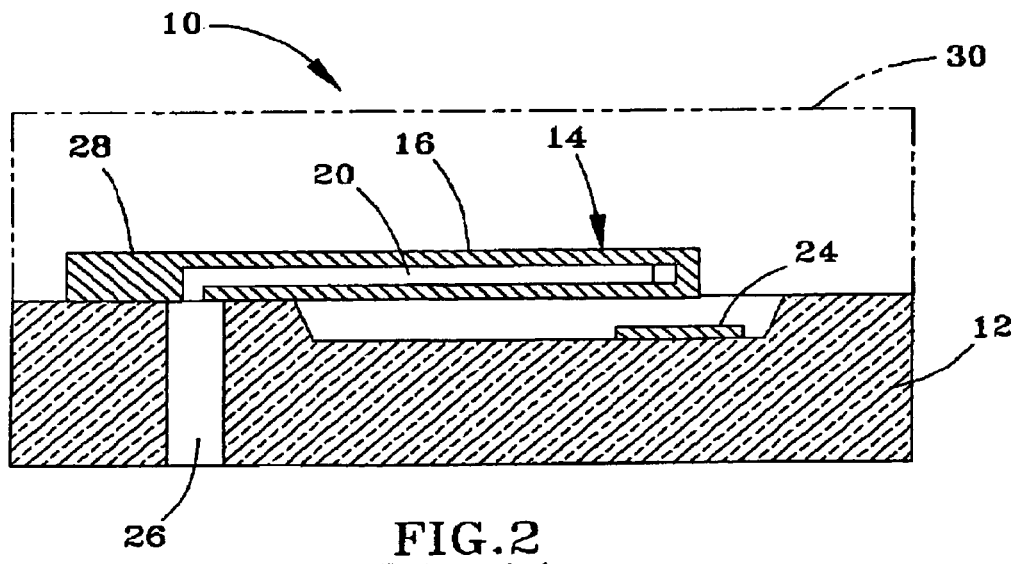
Figure 3:
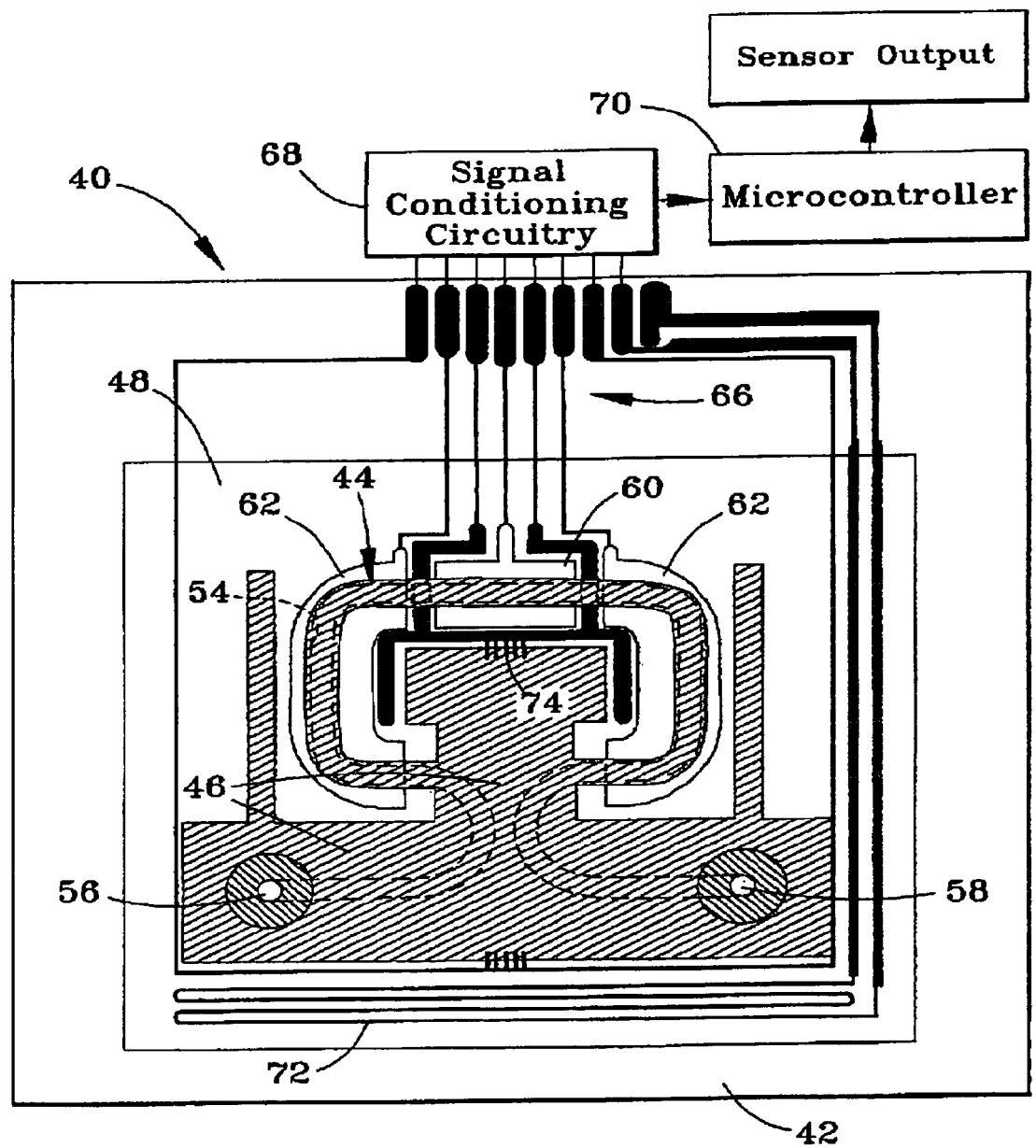
FIG. 3 is a plan view of a microfluidic device with a resonating micromachined tube in accordance with a first embodiment of this invention.
Figure 4:
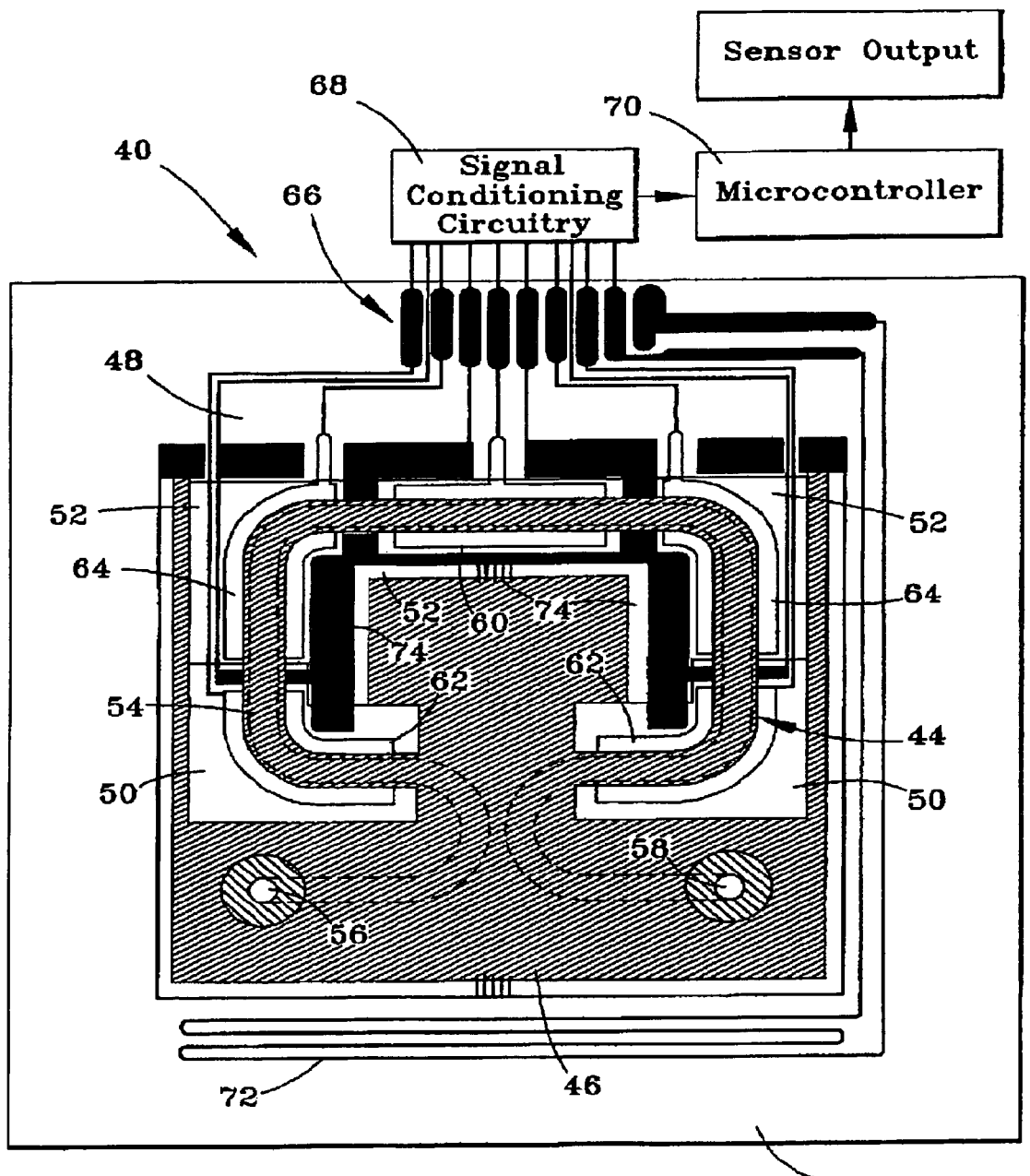
FIG. 4 is a plan view of a microfluidic device with a resonating micromachined tube in accordance with a second embodiment of this invention.

FIGS. 3 and 4 represent microfluidic devices 40 similar in construction and operation to the prior art microfluidic device 10 of FIGS. 1 and 2, but modified to exhibit improved operating characteristics. In FIGS. 3 and 4, consistent reference numbers are used to identify functionally equivalent structures. Each device 40 is represented as being fabricated on a substrate 42, which can be formed of silicon or another semiconductor material, quartz, glass, ceramic, metal, or a composite material. A tube 44 is cantilevered from a base 46 bonded to the substrate 42, such that the tube 44 is suspended above a surface 48 of the substrate 42. In FIG. 3, the surface 48 is defined by a single recess in the substrate 42 underlying the entire tube 44, while in FIG. 4 the surface 48 is defined by multiple recesses 50 and 52 in the substrate 42. The tube 44 is generally U or C-shaped, resulting in the tube 44 having legs with proximate portions immediately adjacent the base 46 and a distal portion interconnecting the legs. Furthermore, the base 46 is between the proximate portions of the legs of the tube 44, and the proximate portions are coaxial. While the shape of the tube 44 shown in FIGS. 3 and 4 is preferred, other shapes—both simpler and more complex—are also within the scope of the invention. The tube 44 defines a continuous microchannel 54 through which a fluid can flow into the tube 44 from the base 46, and is then returned to the base 46 as it exits the tube 44. Fluid preferably enters and exits the device 40 through a fluid inlet 56 and outlet 58 defined in the substrate 42.

The tube 44 and its base 46 are preferably micromachined from silicon, doped silicon, or another semiconductor material, quartz, glass, ceramic, metal or composite material. As used herein, micromachining is a technique for forming very small elements by bulk etching a substrate (e.g., a silicon wafer), or by surface thin-film etching, the latter of which generally involves depositing a thin film (e.g., polysilicon or metal) on a sacrificial layer (e.g., oxide layer) on a substrate surface and then selectively removing portions of the sacrificial layer to free the deposited thin film. The tube 44 and base 46 can either be fabricated entirely from layers of the chosen materials deposited on the substrate 42, or fabricated in part by etching the substrate 42. The shape and size of the tube 44 can be chosen to provide an adequate flow capacity for the fluid and to have suitable vibration parameters for the intended fluids to be evaluated with the device 40. Because micromachining technologies are employed to fabricate the tube 44, the size of the tube 44 can be extremely small, such as lengths of about 0.5 mm and cross-sectional areas of about 250 $\mu m^2$, with smaller and larger tubes also being within the scope of this invention. Particularly suitable configurations and processes for fabricating resonant mass flow and density sensors using micromachining techniques are disclosed in commonly-assigned U.S. Pat. No. 6,477,901 to Tadigadapa et al., commonly-assigned U.S. Pat. No. 6,647,778 to Sparks, and commonly assigned U.S. patent application Publication No. 2006/0175303 to Sparks et al.

According to Tadigadapa et al., each of the micromachined tubes 44 shown in FIGS. 3 and 4 can be vibrated at or near resonance to determine the mass flow rate and density of a fluid flowing through the tube 44 using Coriolis force principles. As such, the devices 40 are suitable for use in chemical concentration applications, including but not limited to drug infusion systems, fuel cell systems, and drug and chemical mixing systems. Coriolis force principles can also be used to ascertain the viscosity, lubricity, and other properties of a fluid flowing through the tube 44. As in Tadigadapa et al., the tube 44 is vibrated in a direction perpendicular to the surface 48 of the substrate 42, preferably at or near its resonant frequency. During half of the vibration cycle in which the tube 44 moves upward, the tube 44 has upward momentum as the fluid travels around the tube bends, and the fluid flowing out of the tube 44 resists having its vertical motion decreased by pushing up on the leg of the tube 44 nearest the fluid outlet 58. The resulting force causes the tube 44 to twist. As the tube 44 moves downward during the second half of its vibration cycle, the tube 44 twists in the opposite direction. This twisting characteristic is referred to as the Coriolis effect, and the degree to which the tube 44 deflects during a vibration cycle as a result of the Coriolis effect can be correlated to the mass flow rate of the fluid flowing through the tube 44, while the density of the fluid is proportional to the frequency of vibration at resonance.

Similar to the device 10 of the prior art, the microfluidic device 40 can be enclosed by a capping wafer to form a sensing package. The use of a capping wafer allows for vacuum packaging that reduces air damping of the tube vibration. A variety of package and wafer-level methods exist to vacuum package devices. These include solder or weld hermetic packages, and wafer bonding using glass frit, solder, eutectic alloy, adhesive, and anodic bonding. A preferred material for the capping wafer is silicon, allowing silicon-to-silicon bonding techniques to be used, though it is foreseeable that a variety of other materials could be used, including metals and glass materials, the latter including borosilicate glass (e.g., Pyrex). In preferred embodiments of the invention, the bond between the capping wafer and substrate 42 is hermetic, and the resulting enclosure is evacuated to enable the tube 44 to be driven efficiently at high quality (Q) factor values without damping. In such an embodiment, a getter material is preferably placed in the enclosure to assist in reducing and maintaining a low cavity pressure. As an alternative to a hermetically sealed package, the tube 44 could be enclosed such that a vacuum can be drawn when desired through the use of a pump.

In addition to the density of the fluid within its microchannel 54, the resonant frequency of the tube 44 is influenced by its mechanical design (shape, size, construction and materials). Resonant frequencies will generally be in the range of about 1 kHz to about 100 kHz for tubes of the type fabricated in accordance with Tadigadapa et al. The amplitude of vibration is preferably adjusted through means used to vibrate the tube 44. As shown in FIGS. 3 and 4, a drive electrode 60 is located on the surface 48 of the substrate 42 beneath the distal portion of the tube 44. If formed of an electrically-conductive material, such as doped silicon, the tube 44 can serve as an electrode that can be capacitively coupled to the drive electrode 60, enabling the electrode 60 to electrostatically drive the tube 44. However, it is foreseeable that the tube 44 could be formed of a nonconductive material, and a separate electrode formed on the tube 44 opposite the electrode 60 for vibrating the tube 44 electrostatically. An alternative driving technique is to provide a piezoelectric element on an upper surface of the tube 44 to generate alternating forces in the plane of the tube 44 that flex the tube 44 in directions normal to the plane of the tube 44. Other alternatives are to drive the tube 44 magnetically, thermally, piezoresistively, thermally, optically, or by another actuation technique.

Also shown in FIGS. 3 and 4 is a pair of sensing electrodes 62 that sense the deflection of the tube 44 relative to the substrate 42, as well as provide feedback to the drive electrode 60 to enable the vibration frequency to be controlled with any suitable on-chip or remote microprocessor or microcontroller 70. The sensing electrodes 62 can sense the proximity or motion of the tube 44 capacitively, electrostatically, magnetically, piezoelectrically, piezoresistively, thermally, optically, or in any other suitable manner capable of sensing the proximity or motion of the tube 44. Furthermore, the degree to which the tube 44 twists during a vibration cycle as a result of the Coriolis effect can be detected by the sensing electrodes 62 on the basis of the amplitude of the deflection and/or the phase difference between the respective sides (legs) of the tube 44 nearest the electrodes 62. Input and output signals to the electrodes 60 and 62 (and electrodes 64 of FIG. 4) are made through bond pads 66 along an edge of the substrate 42, and are transmitted to the microcontroller 70 with appropriate signal conditioning circuitry 68, as schematically represented in FIGS. 3 and 4. Finally, ground contacts 74 are shown as being formed in the same metal layer as that used to form the electrodes 60 and 62 and bond pads 66, and by which an electrical ground to the tube base 46 is provided to enable the tube 44 or an electrode formed on the tube 44 to be capacitively coupled to the drive electrode 60.

As previously discussed in reference to the prior art of FIGS. 1 and 2, the ability to accurately measure properties of a fluid flowing through the resonating tubes 44 of FIGS. 3 and 4 is degraded by the presence of gas bubbles or another second phase within the fluid, the build up of films on the internal walls of the tubes 44, structural imperfections due to manufacturing variations and defects, differences in materials that lead to different responses to temperature and mechanical stress, charge buildup, and other sources. With particular respect to bubbles, the presence of bubbles or another unintended low density second phase within the fluid under evaluation affects the output of the resonating tube 44 by increasing its resonant frequency. The change in resonant frequency due to a lighter second phase can be sufficient to cause an error in liquid chemical concentration applications. For example, in a fuel cell system in which a solution of water and alcohol (e.g., methanol or ethanol) is used, gas bubbles in the solution will yield a false reading that a higher concentration of alcohol is present.

According to a first aspect of the invention, in addition to increasing the resonant frequency of the tube 44, the presence of bubbles or another low density second phase in the fluid under evaluation can be detected as a result of measurably lowering the peak gain and Q factor of the tube 44 via two-phase damping. As such, by also monitoring the peak gain and/or Q factor associated with the output of the tube 44, a lower gain signal or Q factor value can be used to indicate that gas bubbles, and not a higher alcohol concentration in the fluid, are increasing the resonant frequency of the tube 44 and thus yielding an inaccurate density/chemical concentration measurement. A low gain or Q factor reading that falls outside (below) a predetermined threshold value can be used to initiate a computational algorithm with the microcontroller 70 that compensates for the presence of gas bubbles passing through or trapped within the tube 44. For example, the drive signal to the drive electrode 60 can be increased to ensure that the gain of the tube 44 is maintained so that a clear signal output is obtained with the device 40 until the low gain or Q factor reading falls within a empirically or theoretically expected range for the tube 44 and fluid under evaluation. An alternate method is to monitor the tube 44 for readings indicating a sharp increase in resonant frequency coinciding with a sharp decrease in peak gain or Q factor, and then employ an algorithm to filter out any such frequency readings, for example, by using a previous frequency reading, until the peak gain or Q value again falls within an empirically or theoretically expected range for the tube 44 and fluid under evaluation. A lower gain value or Q factor reading can also be used by the microcontroller 70 to trigger a high pressure pulse in the fluid to help flush out any gas bubble that might be trapped in the tube 44.

The gradual build up of a film on the internal walls of the tube 44 often manifests itself as output drift over time. In addition to altering the resonant frequency of the tubes 44 for the devices 40 shown in FIGS. 3 and 4, film build up can also attenuate signals of optical and infrared (IR) sensors and change the speed of sound of ultrasonic sensors. If the build up of certain chemicals in a fluid under evaluation is predictable, such as a fuel cell solution with a fairly constant mixture ratio and by-product formation rate, then the output drift of the device 40 can be empirically or theoretically predicted for periods of time under different temperature conditions. Therefore, by monitoring the temperature of the tube 44 over measured time periods, the microcontroller 70 can be programmed to include a frequency offset algorithm, such that the predicted drift in the mass of the tube 44 due to film build up can be removed from the chemical concentration calculation. This functionality has the capability of significantly reducing measurement errors, and also enables the microfluidic device 40 to operate for longer periods of time without the need to remove the film build-up within the internal microchannel 54 of the tube 44.

For monitoring temperature, the devices 40 of FIGS. 3 and 4 are represented as being equipped with a temperature sensing element 72. A suitable construction for the sensing element 72 can make use of one or more metal layers of the type employed to form the electrodes 60 and 62 and their associated conductive runners. For example, a resistive-based temperature sensing element 72 can be formed by a thin-film metal layer of platinum, palladium, nickel, or another metal or alloy, in accordance with known practices. With the temperature sensing element 72, changes in mechanical properties of the tube 44 and properties of the fluid therein attributable to temperature changes can be compensated for with the signal conditioning circuitry 68.

The above-noted algorithms and functionalities of the microcontroller 70 can be implemented in any suitable manner known in the art, including fuzzy logic algorithms and statistical and probability-based algorithms capable of estimating whether the output of the tube 44 is attributable to changes in the chemical concentrations within the fluid, or gas bubbles present in the fluid, or a film build up on the internal walls of the tube 44. The algorithms can be loaded into the microprocessor 70 using the device 40, in which case the output of the device 40 would be processed by a system computer and the effects of bubbles and/or film build-up removed from the raw sensor output signal. The use of algorithms in the manners described above to compensate for bubbles and film build-up in sensing devices with microchannels is not limited to the embodiments represented in FIGS. 3 and 4, but can also be applied to liquid concentration sensors employing optical or transparent tubes, channels, walls, and windows, ultrasonic/speed-of-sound windows, tubes, and channels, x-ray transmitted sensors, capacitive monitors, heat monitoring sensors, sensors that take resistive measurements through a wall and/or fluid path, and sensors that send a beam or wave through a liquid or monitor the wall of a fluidic channel.

According to another aspect of the invention, the vibration motion induced in the tube 44 by the drive electrode 60 can interfere with the ability of the sensing electrodes 62 to detect the twisting motion of the tube 44 induced by the Coriolis effect. In particular, finite element modeling (FEM) of resonant tube devices configured similarly to that shown in FIG. 3 have evidenced that the amplitude of the drive motion is much greater than that of the twisting motion of the Coriolis flow mode. In particular, FEM analysis has evidenced that the drive motion is greatest at the distal portion of the tube 44 farthest from the base 46 and immediately above the drive electrode 60, and smallest within the proximate portions of the tube 44 immediately adjacent the base 46, where the greatest sensitivity to the twisting motion is also observed as a result of the fluid entering and exiting the tube 44 from the base 46. In response to this analysis, the embodiment of FIG. 4 represents the sensing electrodes 62 as being reduced in size and location for the purpose of sensing the deflection of only the proximate portions of the tube 44 immediately adjacent the base 46, thereby reducing the drive motion of the tube 44 sensed by the sensing electrodes 62. In particular, whereas the sensing electrodes 62 of FIG. 3 extend the entire length of each leg of the tube 44, the sensing electrodes 62 of FIG. 4 extend less than half the length of each leg, i.e., less than half the distance from the base 46 to the distal portion of the tube 44. Computer simulations and empirical test results have evidenced that limiting the size and location of the sensing electrodes 62 in the manner represented in FIG. 4 enhances the resolution of the device 40 for sensing mass flow rate and density of a fluid flowing through the tube 44.

The sensing electrodes 62 are also represented in FIG. 4 as being within the recesses 50, which are preferably formed in the surface 48 of the substrate 42 so as to be shallower than the recesses 52 in which the drive electrode 60 is formed. As such, the gap between the tube 44 and the drive electrode 60 is sufficiently large to accommodate the increasingly greater motion of the tube 44 corresponding to increasing distances from the base 46, whereas the smaller gap between each sensing electrode 62 and the tube 44 enables the sensing electrodes 62 to exhibit increased sensitivity to the deflection of the tube 44. FIG. 4 also represents the device 40 as having a second set of electrodes 64 located between the drive and sensing electrodes 60 and 62 and within the deeper recesses 52. The electrodes 64 can be used as drive electrodes along with or instead of the drive electrode 60, or used as sensing electrodes to supplement the sensing electrodes 62. If the electrodes 64 are used for sensing, either set of the sensing electrodes 62 and 64 can operate on the basis of phase difference and/or amplitude measurement. For example, the phase difference approach can be used by the electrodes 64, while the amplitude measurement approach is used by the electrodes 62 nearest the base 46 where the Coriolis flow effect is most pronounced.

The second set of electrodes 64 can also be employed as balancing electrodes to compensate for errors leading to output drift of the device 40. For example, a bias can be applied to the electrodes 64 to compensate for a twist that is present in the tube 44 as a result of manufacturing or material variations that can cause a zero-flow offset error in the sensor output. A balance control loop can be incorporated into the microcontroller 70 that uses the outputs of the sensing electrodes 62 to vary the balance voltage over temperature and time to compensate for this offset difference between the legs of the tube 44. This compensation can greatly improve the basic noise floor of the device 40, enhancing output resolution and accuracy. Offset compensation can be accomplished with a two-step process. During sensor calibration, any offset error or difference can be nulled out by adjusting the bias of the balance electrodes 64 to provide rough balancing or compensation. The balance control loop can then be employed to perform any further adjustments to the bias of the balance electrodes 64 to complete the compensation process, and allow for corrections to be made during the operation of the device 40.

The electrodes 64 can also be employed to compensate for damping due to a two-phase condition, such as where bubbles, solid particles, an emulsion phase, etc., is present in the fluid being evaluated. When a reduced gain or Q factor condition is detected as discussed previously with respect to FIG. 3, the microcontroller 70 can operate the electrodes 64 as additional drive electrodes to increase the amplitude of the tube 44, with the intent of dislodging and expelling the bubbles, solid particles, emulsion phase, or other second phase that caused the increased damping condition.

As noted above, the shallower recesses 50 in which the sensing electrodes 62 are formed results in smaller gaps being present between the sensing electrodes 62 and the proximate portions of the tube 44 as compared to the gap between the electrodes 60 and 64 and the remaining portions of the tube 44, thereby providing the sensing electrodes 62 with greater sensitivity (higher sensor gain) to the twisting motion of the tube 44 as compared to the electrodes 64. The shallower gap between the tube 44 and sensing electrodes 62 is preferably in a range of about 0.1 microns to about 4 microns, with the gaps between the tube 44 and drive electrode 60 and between the tube 44 and the electrodes 64 being greater. While the recesses 50 and 52 are represented as being etched into the surface 48 of the substrate 42, it should be understood that the same affect can be obtained by micromachining the tube 44 so that the gaps between the tube 44 and sensing electrodes 62 are less than the gaps between the tube and the electrodes 60 and 64. Furthermore, it should be understood that the electrodes 62 and 64 could be spaced the same distance from the tube 44, though with reduced sensitivity to the twisting motion of the tube 44.

It should be noted that the relative lengths of the tube 44 associated with sensing electrodes 62 as compared to the second set of electrodes 64 can vary. While the electrodes 64 are represented in FIG. 4 as being larger than the sensing electrodes 62, and therefore associated with longer lengths of the tube 44 than the sensing electrodes 62, in some cases it may be preferable that the sensing electrodes 62 are larger than the electrodes 64.

While the invention has been described in terms of certain embodiments, it is apparent that other forms could be adopted by one skilled in the art. Therefore, the scope of the invention is to be limited only by the following claims.

The invention claimed is:

1. A microfluidic device for determining at least one property of a fluid, the device comprising:
    a substrate having a surface and a first surface region defined thereon;
    a structure comprising a base supported by the substrate and a tube extending from the base and spaced apart from the surface of the substrate so as to be adapted for vibrating in a plane normal to the surface of the substrate, the tube having a continuous internal passage, a first portion adjacent the base and defining a fluid inlet of the passage, a second portion adjacent the base and defining a fluid outlet of the passage, and a distal portion relative to the base and spaced apart from the first surface region;
    a drive electrode within the first surface region of the substrate, adjacent the distal portion of the tube, and adapted for vibrating the tube to induce a drive motion and a twisting motion therein;
    first and second sensing electrodes on the substrate, adjacent the base and respectively the first and second portions of the tube, coupled to the first and second portions of the tube so as to sense deflections of the first and second portions of the tube when vibrated with the drive electrode, and adapted for producing outputs corresponding to the sensed deflections, each the first and second sensing electrodes extending less than half a distance from the base to the distal portion of the tube so as to be relatively less sensitive to the drive motion of the tube and relatively more sensitive to the twisting motion of the tube;
    a pair of electrodes adjacent the tube and on the surface of the substrate, a first of the pair of electrodes being between the drive electrode and the first sensing electrode and a second of the pair of electrodes being between the drive electrode and the second sensing electrode; and
    means for determining at least one property of the fluid from the outputs of the first and second sensing electrodes.

2. The microfluidic device according to claim 1, wherein the pair of electrodes are means for vibrating the tube in addition to the drive electrode.

3. The microfluidic device according to claim 1, wherein the pair of electrodes are means for sensing deflections of the tube in addition to the first and second sensing electrodes.

4. The microfluidic device according to claim 3, wherein the first and second sensing electrodes sense amplitudes of the deflections of first and second portions of the tube, and the pair of electrodes sense a phase difference in the deflections of the first and second portions of the tube.

5. The microfluidic device according to claim 1, further comprising means for applying a bias to the pair of electrodes and balancing the tube to counter the twisting motion of the tube.

6. The microfluidic device according to claim 1, further comprising means for operating the pair of electrodes as additional drive electrodes if a damped condition is detected by the first and second sensing electrodes while the tube is vibrated with the drive electrode.

7. The microfluidic device according to claim 1, wherein each of the first and second sensing electrodes is spaced about 0.1 to about 4 micrometers from the tube.

8. The microfluidic device according to claim 7, wherein each of the first and second sensing electrodes is closer to the tube than the pair of electrodes.

9. The microfluidic device according to claim 7, wherein each of the first and second sensing electrodes is closer to the tube than the pair of electrodes and the drive electrode.

10. The microfluidic device according to claim 1, wherein the drive electrode and the pair of electrodes are within the first surface region of the substrate, the first and second sensing electrodes are within second surface regions of the substrate, the first and second surface regions are defined by recesses in the surface of the substrate, and at least a first of the recesses defining the first surface region is deeper than at least a second of the recesses defining the second surface regions.

11. The microfluidic device according to claim 1, further comprising means for altering the operation of the determining means if a damped condition is detected while the tube is vibrated with the drive electrode.

12. The microfluidic device according to claim 1, further comprising means for triggering a high pressure pulse in the fluid if a damped condition is detected while the tube is vibrated with the drive electrode.

13. The microfluidic device according to claim 1, further comprising means for measuring time and temperature during operation of the microfluidic device and applying a frequency offset to the outputs of the first and second sensing electrodes based on the sensed time and temperature.

14. The microfluidic device according to claim 1, wherein the tube has a C-shaped configuration, and the first and second portions of the tube immediately adjacent the base are parallel to the distal portion of the tube.

15. The microfluidic device according to claim 1, wherein the base is between the first and second portions of the tube and the first and second portions are coaxial.

16. The microfluidic device according to claim 1, wherein the microfluidic device is installed in a system chosen from the group consisting of chemical concentration sensors, fuel cell systems, and drug delivery systems.

17. A method of operating the microfluidic device of claim 1 to sense the density of a fluid, the method comprising:

causing the tube of the microfluidic device to vibrate as the fluid flows through the passage within the tube;

producing a series of outputs corresponding to the vibration frequency of the tube; and determining the density of the fluid flowing through the passage within the tube on the basis of at least a first set of the outputs and performing at least one of:

excluding from the determination any outputs altered by a second phase in the fluid; and offsetting the density for any film build-up within the tube.

18. The method according to claim 17, wherein the method comprises only one of the excluding and offsetting steps.

19. The method according to claim 17, wherein the method comprises each of the excluding and offsetting steps.

20. The method according to claim 17, wherein the excluding step is performed for any outputs produced while the peak gain or quality factor of the tube falls outside a predetermined threshold therefor.

21. The method according to claim 17, wherein the offsetting step comprises sensing time and temperature of the fluid while the fluid is flowing and offsetting the density based on the sensed time and temperature.

22. The method according to claim 17, further comprising the step of triggering a high pressure pulse in the fluid if the peak gain or quality factor of the tube falls outside a predetermined threshold therefor.

* * * * *